Feb. 19, 1924.

F. E. ISRAEL

SAFETY CLUTCH

Filed Feb. 11, 1922    3 Sheets-Sheet 1

1,484,221

Floyd E. Israel
Inventor

Attorney

Feb. 19, 1924.
1,484,221
F. E. ISRAEL
SAFETY CLUTCH
Filed Feb. 11, 1922    3 Sheets-Sheet 2
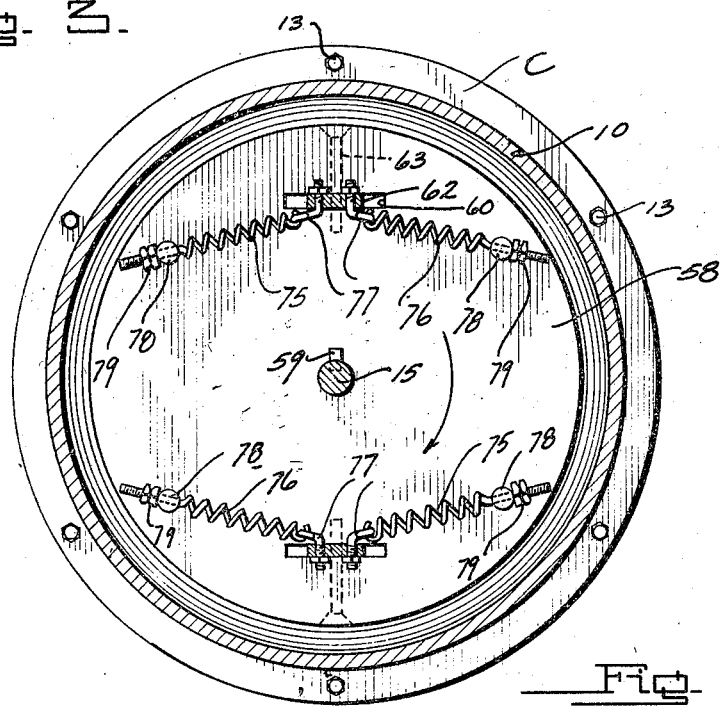
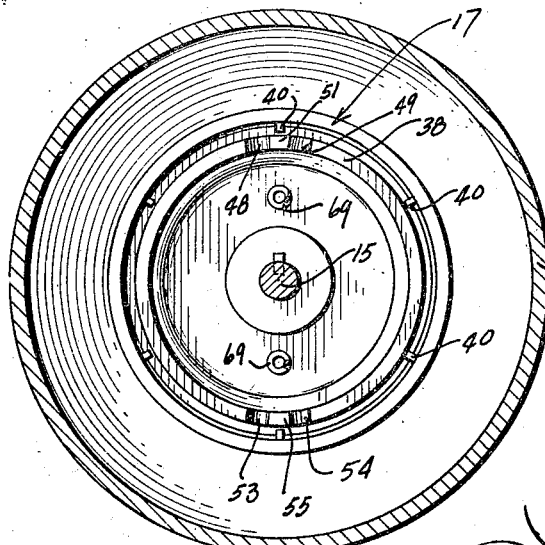
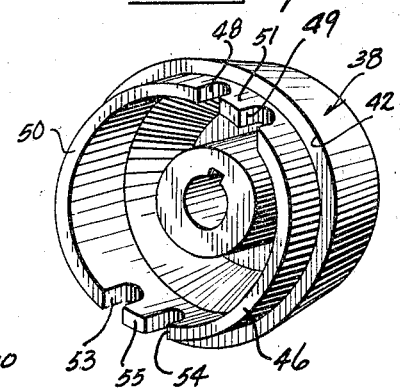
Floyd E. Israel
Inventor

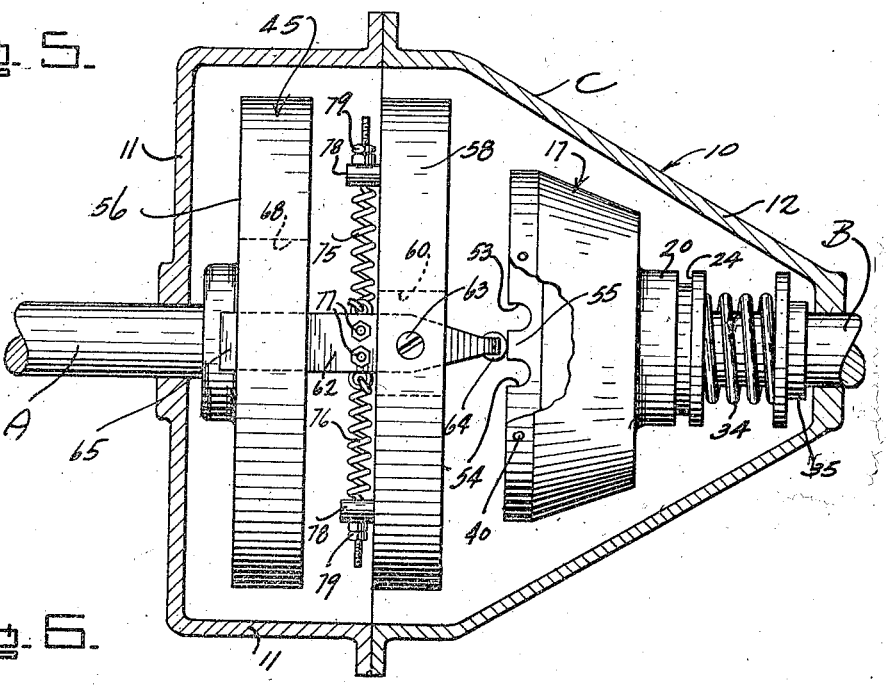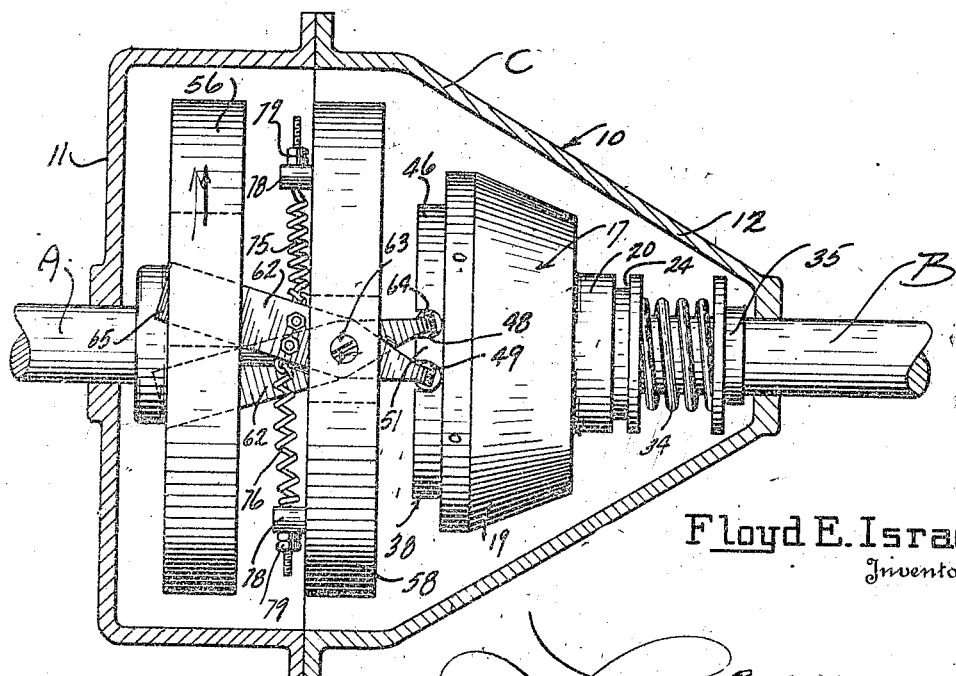

Patented Feb. 19, 1924.

1,484,221

UNITED STATES PATENT OFFICE.

FLOYD EDSON ISRAEL, OF LE ROY, KANSAS.

SAFETY CLUTCH.

Application filed February 11, 1922. Serial No. 535,847.

*To all whom it may concern:*

Be it known that I, FLOYD E. ISRAEL, a citizen of the United States, residing at Le Roy, in the county of Coffey and State of Kansas, have invented certain new and useful Improvements in Safety Clutches, of which the following is a specification.

This invention relates to improvements in safety clutches.

The primary object of the invention is the provision of a safety clutch adapted for automatic disconnection between drive and driven shafts, incident to overloading of the former by reason of added work, friction of parts, or excessive drag.

A further object of the invention is the provision of an automatic releasing clutch to prevent overload of a driving shaft, adapted for quick adjustment to place the same in operative relation to establish a driving connection between driving and driven shafts.

A further object of the invention is the provision of an improved safety clutch of the above described character, which is simple in construction, automatic in operation, and adapted for operation upon forward and reverse speeds, and one which is particularly well adapted for use in connection with power mechanisms employing a clutch, to prevent strain or breakage of any of the parts connected thereto.

Other objects and advantages will be apparent during the course of the following detailed description.

In the accompanying drawings forming a part of this specification, and wherein similar reference characters designate corresponding parts throughout the several views, Figure 1 is a longitudinal cross sectional view taken through the improved safety clutch and showing the same in operative relation to driving and driven shafts.

Figure 3 is a cross sectional view taken substantially on the line 3—3 of Figure 1.

Figure 4 is a transverse cross sectional view taken substantially on the line 4—4 of Figure 1.

Figure 5 is a plan view of the safety clutch details showing the same in relative position during a driving connection between the drive and driven shafts.

Figure 6 is a plan view of the improved clutch details showing the same in relative positions after a disconnection of the drive and driven shafts by automatic operation of the clutch mechanism.

Figure 7 is a perspective view of a clutch member part embodied in the improved safety clutch mechanism.

Figure 1:
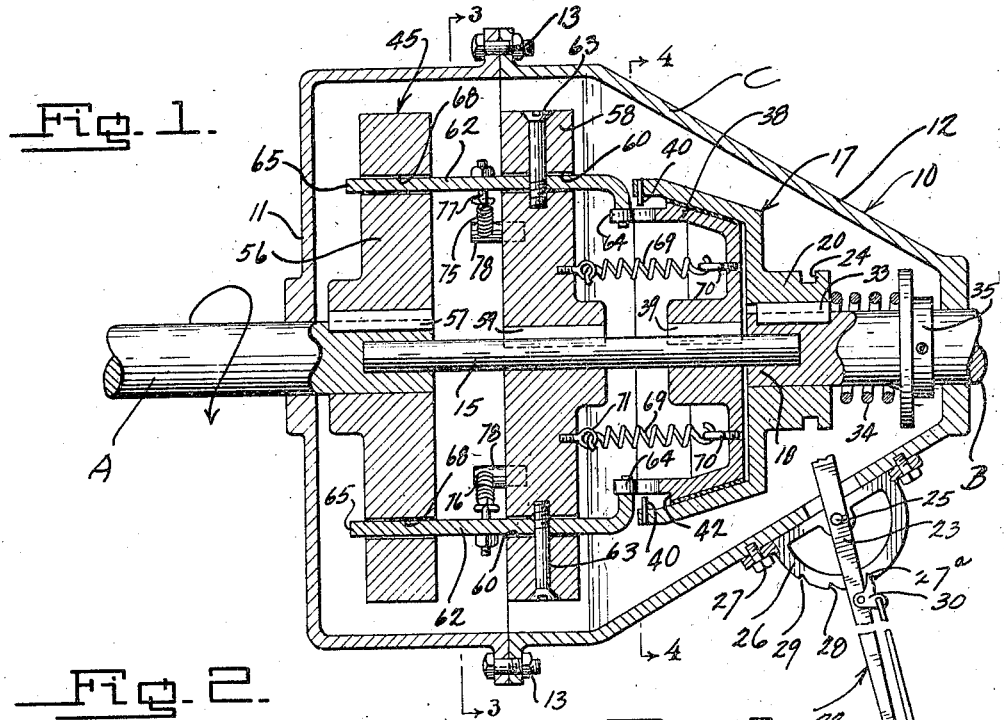

In the drawings, wherein for the purpose of illustration is shown the preferred embodiment of my invention, the letter A designates a driving shaft, and B a driven shaft; the shafts A and B being connected by the improved safety clutch mechanism C.

The details of the improved safety clutch mechanism C preferably include a housing 10 formed of parts 11 and 12, which may be suitably connected by bolts 13, in order that access may be had to the safety clutch details. The safety clutch mechanism is of course, susceptible of adaptation to power propelled vehicles, as well as for use upon any type of power machinery embodying a clutch, such as lathes, drilling machinery, metal cutting mechanisms and the like. It is preferred that the drive and driven shafts A and B respectively, be in alignment and have their ends spaced from each other and provided with a relatively small diameter shaft 15, the ends of which are journalled in the ends of the drive and driven shafts. Bearing sleeves, or antifriction bearings may be provided, if desired, to support the ends of the shaft 15 in the ends of the drive and driven shafts A and B. An external clutch cone 17 may be splined, upon the end 18 of the shaft B so that the cone portion 19 thereof extends outwardly toward the shaft 15 and driven shaft A. The clutch part 17, preferably embodies the ordinary annularly grooved collar 20 adapted for use in connection with a regulating mechanism 22, which embodies a lever 23 upon an end of which is formed an ordinary yoke (not shown) to cooperate in the groove 24 of the collar or sleeve 20; said lever 23 being pivoted, as at 25, to a quadrant 26, secured as by retaining elements 27, to the exterior of the casing portion 12. The quadrant 26 is preferably provided with three toothed depressions 27ª, 28 and 29 adapted for engagement by the pawl 30 pivotally mounted upon the lever 23, and operated by the usual mechanism 31 from the handle portion of the lever 23; and by which means the lever 23 may be held in a determined position for disposal of the clutch part 17 in a defined location longitudinally of the shaft B; yet permitting rotation of said clutch part with the shaft B by reason of the key 33 fixed to the shaft B. A spring 34 is provided, preferably of the compression type, adapted for engagement intermediate the end of the sleeve 20 and a collar 35 fixed upon the shaft B, and whereby the clutch part 17 is normally urged toward the drive shaft A.

A second clutch cone 38 is splined upon the shaft 15; the same being the internal cone part for engagement interiorly of the cone part 17, much in the ordinary manner, to provide a frictional driving relation between said cone parts 17 and 38. The cone section 38, may, of course, slide longitudinally upon the shaft 15, but is keyed against rotation about its supporting shaft 15 by the key member 39 fixed in the shaft 15. The relative longitudinal movement permitted by the clutch sections 17 and 38 is limited by pins 40, which project radially inwardly from the outer marginal edges of the cone 19, and are adapted for contact with the annular shoulder 42 provided circumferentially about the section 38. For cooperating with the releasing mechanism 45, to be subsequently described, the clutch section 38 is provided with an annular flange 46 extending outwardly from the shoulder 42, and which is provided with a pair of proximately positioned depressions 48 and 49, disposed inwardly from the outer marginal edge 50 of the flange 46 to provide a shoulder projection 51. Similarly, diametrically opposed to the depressions 48 and 49, a second pair of depressions 53 and 54 are provided, to provide a shoulder 55 altogether similar to the shoulder 51.

Referring to the mechanism 45, the same preferably includes a disc 56 keyed as at 57, upon the extreme end of the drive shaft A and, of course, within the casing 10; a second disc 58 being keyed as at 59 to the intermediate shaft 15, substantially midway of the facing ends of the drive and driven shafts A and B. Both discs 56 and 58 are securely fastened to the shafts A and 15 respectively, against longitudinal or rotational movement with respect to the shafts upon which mounted. The member 58 is provided at diametrically opposed points with slots 60, which have the arms, pawls, or levers 62 pivoted therein as by screws 63, which are fastened radially, inwardly from the outer marginal edge of the disc 58, so that they intersect the slots 60, to properly provide for pivoting of the arms 62. The ends of the arms 62 extending toward the clutch section 38, may be tapered, and inturned toward the axis of the shaft 15; having suitable bearing rollers 64 rotatably mounted upon these inturned ends. The opposite ends 65 of the arms 62 extend toward the disc 56, projecting through arcuate slots 68 formed transversely therein. The slots 68 are relatively longer than the width of the arm ends 65 which they receive, and are preferably struck from the axis of the shaft A as a center.

In effecting the purpose for which the improved safety clutch has been provided, it is desired that the clutch section 38 be normally urged toward its adjacent disc member 58, as by the tension springs 69, which engage suitable eye bolts 70 and 71, disposed within the clutch section 38 and in a side of the disc member 58 respectively. The clutch arms 62 bear a definite relation to the bearing shoulders 51 and 55 provided upon the clutch section 38; the section 38 and disc 58 being so relatively keyed to the shaft 15, as to have the rollers 64 of the arms 62 bear directly upon the outer marginal edge of the shoulders 51 and 55, when said arms 62 are disposed in longitudinal alignment with respect to the alignment defined by the drive and driven shafts A and B. Thus, when the arms 62 are in such position, the springs 69 will maintain the clutch section 38 in tight engagement against the rollers 64 of said arms, and as can readily be seen from Figure 1 of the drawings.

Each of the arms or levers 62 are maintained in proper alignment to hold the clutch section 38 in the position described above by springs 75 and 76 disposed upon each side thereof; the same being preferably tension springs so that the ends of the arms 62 are counter-balanced, so to speak, so as to maintain the alignment above described. The springs 75 and 76 are supported by the L-shaped bolts 77 upon the sides of the arms 62, being inserted at their other ends through extension sleeves or projections 78. The extreme ends of the springs 75 and 76 which extend thru the sleeves 78 are preferably screw threaded, for receiving the nuts 79, whereby the tension of said springs 75 and 76 may be varied, in order to accommodate various loads upon the drive shaft A. In other words, in order to rock either of the arms 62 upon their pivot pins 63, the force upon the ends 65 of said arms necessary to perform such work, may be varied by adjustment of the springs 75 and 76, which maintain said arms 62 in their proper positions with respect to the shoulders 51 and 55 of the clutch section 38.

Figures 2, 8:
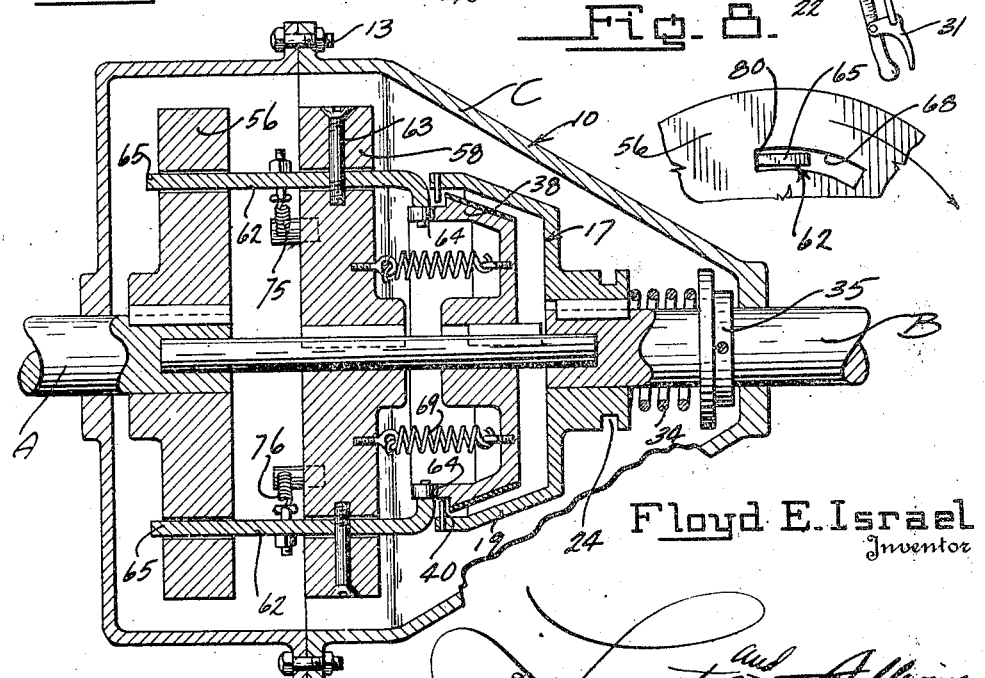
Figure 2 is a longitudinal cross sectional view taken through the improved safety clutch mechanism and showing the manner in which the same operates to disconnect the driving and driven shafts.
Figure 8 is a fragmentary elevation showing the manner in which several details of the improved safety clutch cooperate to provide a driving connection of the power and driven shafts.

Assuming the clutch sections 17 and 38 to be in engagement, as illustrated in Figure 1, the section 17, of course, being held in engagement with the section 38 by reason of positioning of the lever 23 to have its pawl 30 engage in the depression 27ª. The driving shaft A slowly starting under the necessary power to rotate the shaft B, will rotate independent of the shaft B and the disc 58, upon which the arms 62 are disposed, until end edges 80 of the slots 68 in the disc member 56 engage the lateral edges of the diametrically opposed arms 62. If the direction of rotation of the drive shaft A is to the right as indicated by the arrows in Figures 1, 3, and 8, the strain of receiving the power from shaft A will be placed upon the tension springs 75. The power from the shaft A will set the shaft 15 rotating by reason of connection of the disc 58 and its pivoted arms 62 therewith. Because of the frictional engagement of the clutch sections 17 and 38, the driven shaft B will be rotated by the drive shaft A.

Should the drive shaft A start its rotation at a high speed ratio or should the shaft B have a load thereon greater than the safety clutch mechanism C is adjusted to withstand, the drag incident to such conditions will cause the arms 62 to swing upon their pivots; the power shaft A having, of course, been placed in operation. As illustrated in Figure 6, when the arms 62 are rocked upon their pivots, the rollers 64 thereof, will ride off the shoulders 51 and 55 against which they rest. The springs 69 asserting themselves will force or pull the clutch section 38 toward the disc member 58 and whereby the roller ends 64 of the levers or arms 62 are disposed in the depressions 49 and 53 of the clutch section 38. This operation of the clutch section 38 sliding upon the shaft 15 will release relative engagement of the clutch sections 17 and 38, and of course, throw out the driving connection of the drive and driven shafts.

In order to bring the clutch section 38 back into engagement with its companion section 17, it is necessary to swing the regulating lever 23 until the pawl 30 thereof is substantially in the depression 29 provided in the quadrant 26. During this movement, the inwardly projecting pins 40 of the clutch section 17 will engage the shoulder 42 of the clutch section 38, and whereby said clutch section 38 will be slid upon its shaft 15, so that the roller ends 64 of the arms 62 are released from the depressions in which they were automatically positioned. The power upon the drive shaft A having been reduced, the springs 75 and 76 will counterbalance, so that the arms 62 are again positioned in alignment with the power driven shaft. In this relation the clutch section 38 is again held by means of the roller ends 64 of the arms 62 resting against the shoulders 51 and 55.

The safety clutch C will work automatically during rotation of the power shaft A in either direction. As indicated in Figure 6, rotation of the power shaft A is to the left, and as there was an overload upon the driven shaft B, the tension of the supporting springs 76 were overcome, so that the arm 62 operated in reverse manner to that above described, whereby the roller ends thereof were positioned in the depressions 48 and 54 of the clutch section 38; the result of course, being the same, namely, disconnection of the power and driven shafts.

So long as the load upon the driven shaft B remains greater than that for which the safety clutch mechanism C is adjusted, the power shaft A will rock the arms 62 to release relative engagement of the clutch cone sections 17 and 38 to automatically disconnect driving connection. This disconnection will continue, no matter how often the operator swings the lever 23 to right the position of the clutch section 38, so long as the overload upon the driven shaft remains.

The springs 75 and 76 may be adjusted as to their tension and in which manner various loads upon the driven shaft B may be accommodated.

If the driver of the mechanism desires to release the driven shaft B from connection with the power shaft A, the same can readily be done by swinging the lever 23 until the pawl 30 thereof is disposed in the depression 28, which merely has the effect of moving the clutch section 17 upon its shaft B out of relative engagement with the clutch section 38; this operation being effected without rocking of the lever 62 to perform the releasing operation above described.

From the foregoing description of the improved safety clutch, it can readily be seen that various loads may be placed upon the driven shaft B without liability of twisting or strain upon any of the shaft parts. Should an operator of a cutting machine have a dull cutting tool upon the driven shaft B, the overload which a cutting operation would impose upon a driven shaft B would automatically throw the power and driven shafts A and B respectively out of driving connection.

Various changes in the shape, size and arrangement of parts may be made to the illustrated construction of the improved safety clutch, without departing from the spirit of the invention or the scope of the claims.

I claim:

1. In a safety clutch, the combination with a pair of shafts defining drive and driven shafts, a third shaft bearing in said drive and driven shafts, a pawl, means pivotally and resiliently supporting said pawl on the third shaft, a clutch part on one of said pair of shafts, a second clutch part mounted on the third mentioned shaft, means normally forcing said second clutch part into engagement with said pawl, and means on the second of said pair of shafts for engaging said pawl whereby upon overload on the driven shaft, the pawl will be swung to release the second clutch part from engagement with the first clutch part to release a driving connection between the drive and driven shafts.

2. A safety clutch mechanism comprising a pair of shafts defining drive and driven shafts, a third shaft bearing in said drive and driven shafts, a clutch embodying a part splined on one of the pair of shafts and a second part splined on the third shaft, holding means supported from said third shaft and adapted for maintaining said second clutch part in engagement with the first mentioned clutch part to establish a driving connection between the shafts upon which the clutch parts are mounted, and means on the second of the pair of shafts adapted for engaging said clutch holding means to move the first shaft with the other shafts and upon overload upon the driven shaft adapted for movement whereby the second clutch part will automatically be released to disconnect the clutch.

3. A safety clutch mechanism comprising in combination a pair of shafts defining drive and driven shafts, a third shaft supported from the ends of the said shafts, a pair of cooperating clutch parts splined on the third shaft and one of the first mentioned pair of shafts, resiliently supported means on the third shaft for holding said clutch parts in engagement with each other to establish a driving connection between the drive and driven shafts, said resiliently supported means adapted for movement upon overload on any of the shafts to release the clutch parts to disconnect the driving engagement between the drive and driven shafts.

4. A clutch mechanism embodying a drive shaft, a driven shaft, a third shaft bearing in the ends of said drive and driven shafts, a clutch part on the driven shaft, a clutch part on the third shaft adapted for establishing driving connection between the third and driven shafts, a disc member keyed to the third shaft, an arm pivotally connected to the disc member, means adapted for maintaining said arm in position to hold the clutch parts in relative engagement, spring means engaging said disc and clutch part on the third shaft to normally pull the latter clutch part toward said disc, and means on the drive shaft engaging said pivotally mounted arm at an end opposite to its clutch engaging end, whereby when the load on the driven shaft is more than the resilient holding means, the clutch part on the third shaft will be automatically released from its cooperating clutch part.

5. A clutch mechanism comprising drive and driven shafts, a third shaft bearing between the drive and driven shafts, a clutch part longitudinally movable on said driven shaft, means for moving said clutch part and holding the same in a determined position, a second clutch part keyed to said third shaft and longitudinally slidable thereon adjacent said first mentioned clutch part, said second clutch part having a recess therein, a member fixedly keyed on said third shaft adjacent said second clutch part, an arm pivotally supported by said member, spring means engaging said arm and acting in opposite directions to maintain said arm in a resiliently supported predetermined position upon said member so that the same will engage said second clutch part to normally maintain the same farthest extended toward the first mentioned clutch part, spring means connecting said second clutch part and the member on said third shaft normally tending to move the said second clutch part toward said member, and means carried by said drive shaft engaging said pivotally mounted arm at an end opposite to the end of said arm which engages said second mentioned clutch part, said arm adapted to swing against the springs which support the same incident to an overload upon the driven shaft so that said arm will ride into the recess of said second mentioned clutch part to release relative engagement with the first mentioned clutch part.

FLOYD EDSON ISRAEL.